United States Patent
Luo et al.

(10) Patent No.: US 9,571,164 B1
(45) Date of Patent: Feb. 14, 2017

(54) REMOTE AUTHENTICATION USING NEAR FIELD COMMUNICATION TAG

(71) Applicant: EMC Corporation, Hopkinton, MA (US)

(72) Inventors: Guoying Luo, Lexington, MA (US); Ari Juels, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 483 days.

(21) Appl. No.: 13/923,764

(22) Filed: Jun. 21, 2013

(51) Int. Cl.
*H04B 5/00* (2006.01)

(52) U.S. Cl.
CPC ................... *H04B 5/0056* (2013.01)

(58) Field of Classification Search
CPC ... H04B 5/0056; H04B 5/0062; H04B 5/0068; G07C 9/00571; H04L 63/0492
USPC .................................. 340/10.1, 5.6
See application file for complete search history.

(56) References Cited

U.S. PATENT DOCUMENTS

| | | | | |
|---|---|---|---|---|
| 8,508,338 B1* | 8/2013 | Fiddy | ............... | G06Q 20/40145 340/5.52 |
| 2006/0126846 A1* | 6/2006 | Araki | .................. | H04L 63/0435 380/277 |
| 2008/0301444 A1* | 12/2008 | Kim | ........................ | H04L 63/08 713/169 |
| 2009/0044012 A1* | 2/2009 | Bishop | .................... | G06Q 20/20 713/168 |
| 2011/0212707 A1 | 9/2011 | Mahalal | | |
| 2011/0291803 A1* | 12/2011 | Bajic | ................... | G08B 13/2462 340/10.1 |
| 2012/0185697 A1 | 7/2012 | Buer | | |
| 2012/0280789 A1* | 11/2012 | Gerhardt | ............ | G07C 9/00309 340/5.61 |
| 2014/0047242 A1* | 2/2014 | Ukil | ...................... | H04W 12/04 713/171 |

OTHER PUBLICATIONS

Yubico, "Technical Description," www.yubico.com/products/yubikey-hardware/yubikey-neo/technical-description/, 2013, 2 pages.
Hot for Security, "Android Key Fob Secures Online Authentication Via NFC," www.hotforsecurity.com/blog/android-key-fob-secures-online-authentication-via-nfc-3222.html, Jan. 2013, 4 pages.

(Continued)

*Primary Examiner* — Nabil Syed
(74) *Attorney, Agent, or Firm* — Ryan, Mason & Lewis, LLP

(57) ABSTRACT

An apparatus comprises a processing device comprising NFC interface circuitry, network interface circuitry, a memory and a processor coupled to the memory. The processing device is configured to establish an NFC connection with an NFC tag using the NFC interface circuitry, establish a network connection with an authentication server using the network interface circuitry, and forward one or more messages between the NFC tag and the authentication server, the one or more messages comprising messages of a challenge/response authentication protocol performed between the NFC tag and the authentication server. Responsive to a successful completion of the challenge/response authentication protocol between the NFC tag and the authentication server, the processing device is authenticated to the authentication server.

20 Claims, 5 Drawing Sheets

(56) References Cited

OTHER PUBLICATIONS

Gluu, "USB & NFC Hard Token Authentication, Gluu Integrates YubiKey for Secure Hard Token Two-Factor Authentication," www.gluu.org/two-factor-authentication-security/yubikey/, 2013, 3 pages.
Ideas Project, "NEC Authentication," https://ideasproject.com/idea/-/ideas/648113;jsessionid=DEE62C749EDCBC0F7F13EE3E149CFA, 2012, 4 pages.
Vijayakrishnan Pasupathinathan, "Hardware-Based Identification and Authentication Systems," Macquarie University, Faculty of Science, Thesis for the Degree of Doctor of Philosophy, Department of Computing, Dec. 2009, 204 pages.
G. Alpár et al., "Using NFC Phones for Proving Credentials," 16th International GI/ITG Conference on Measurement, Modelling, and Evaluation of Computing Systems and Dependability and Fault Tolerance (MMB/DFT), Mar. 2012, pp. 317-330, Kaiserslautern, Germany.

\* cited by examiner

REMOTE AUTHENTICATION USING NEAR FIELD COMMUNICATION TAG

FIELD

The present invention relates generally to cryptography, and more particularly to authentication techniques.

BACKGROUND

Near field communication (NFC) is a set of standards for smartphones and other processing devices for establishing radio communication with one another by touching them together or bringing them into close proximity, typically on a range of a few centimeters. NFC operates at 13.56 MHz on the International Organization for Standardization (ISO)/International Electrotechnical Commission (IEC) 18000-3 air interface at rates ranging from approximately 106 kbit/s to 424 kbits/s. NFC typically involves an initiator and a target. In some arrangements, the initiator actively generates a radio frequency (RF) field that powers a passive target. This allows NFC targets to take very simple form factors that do not require batteries.

An NFC target may comprise a microchip with small aerials which is capable of storing a small amount of information for transfer to an NFC initiator. Devices with NFC capability are becoming generally available. Examples of such devices include smartphones, tablets, laptops and other computing and processing devices.

SUMMARY

In one embodiment, an apparatus comprises a processing device comprising NFC interface circuitry, network interface circuitry, a memory and a processor coupled to the memory. The processing device is configured to establish an NFC connection with an NFC tag using the NFC interface circuitry, establish a network connection with an authentication server using the network interface circuitry, and forward one or more messages between the NFC tag and the authentication server, the one or more messages comprising messages of a challenge/response authentication protocol performed between the NFC tag and the authentication server. Responsive to a successful completion of the challenge/response authentication protocol between the NFC tag and the authentication server, the processing device is authenticated to the authentication server.

In another embodiment, an apparatus comprises an authentication server comprising network interface circuitry, a memory and a processor coupled to a memory. The authentication server is configured to establish a network connection with a processing device using the network interface circuitry, perform a challenge/response authentication protocol with an NFC tag connected to the processing device by sending to and receiving from the processing device over the network connection one or more messages for the challenge/response authentication protocol, and authenticate the processing device responsive to a successful completion of the challenge/response authentication protocol with the NFC tag.

These and other features and advantages of embodiments of the present invention will become more readily apparent from the accompanying drawings and the following detailed description.

DETAILED DESCRIPTION

Illustrative embodiments of the present invention will be described herein with reference to exemplary communication systems and associated servers, NFC devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

Cryptographically capable NFC tags support strong mutual authentication between the tag and a tag reader. The term NFC tag as used herein is intended to be construed broadly to encompass any device with NFC capability. A device with NFC capability may be a standalone NFC device, a device with NFC circuitry embodied therein, a device with removable NFC circuitry, etc. An NFC tag may take on a variety of form factors, which include but are not limited to form factors such as a card, sticker, key fob, token and various other small and lightweight processing devices.

Embodiments of the invention enable a user to authenticate to a remote server responsive to a successful completion of an authentication protocol between an NFC tag and the remote server. The user, through a processing device which relays or otherwise forwards messages between an NFC tag and remote server, is authenticated to the remote server responsive to a successful completion of the challenge/response authentication protocol. One or more messages in the authentication protocol are encrypted using a key shared by the NFC tag and the remote server. The user does not have knowledge of the shared key, and thus cannot decrypt the messages forwarded between the NFC tag and the remote server in the authentication protocol. The messages forwarded by the processing device may be bound to an identity of the user and/or processing device for added security. Embodiments may utilize built-in authentication protocols of an NFC tag which are suitably modified to function as described herein.

An example of an NFC tag with built-in authentication protocols is the MIFARE DESFire™ EV1 token produced by NXP Semiconductors. The MIFARE DESFire™ EV1 has a number of selectable cryptographic methods, including 2-Key Triple Data Encryption Standard (2KTDES), 3-Key Triple Data Encryption Standard (3KTDES) and 128-bit Advanced Encryption Standard (AES128). An NFC tag used in embodiments of the invention may be a suitably modified MIFARE DESFire™ EV1 token.

Figure 1:
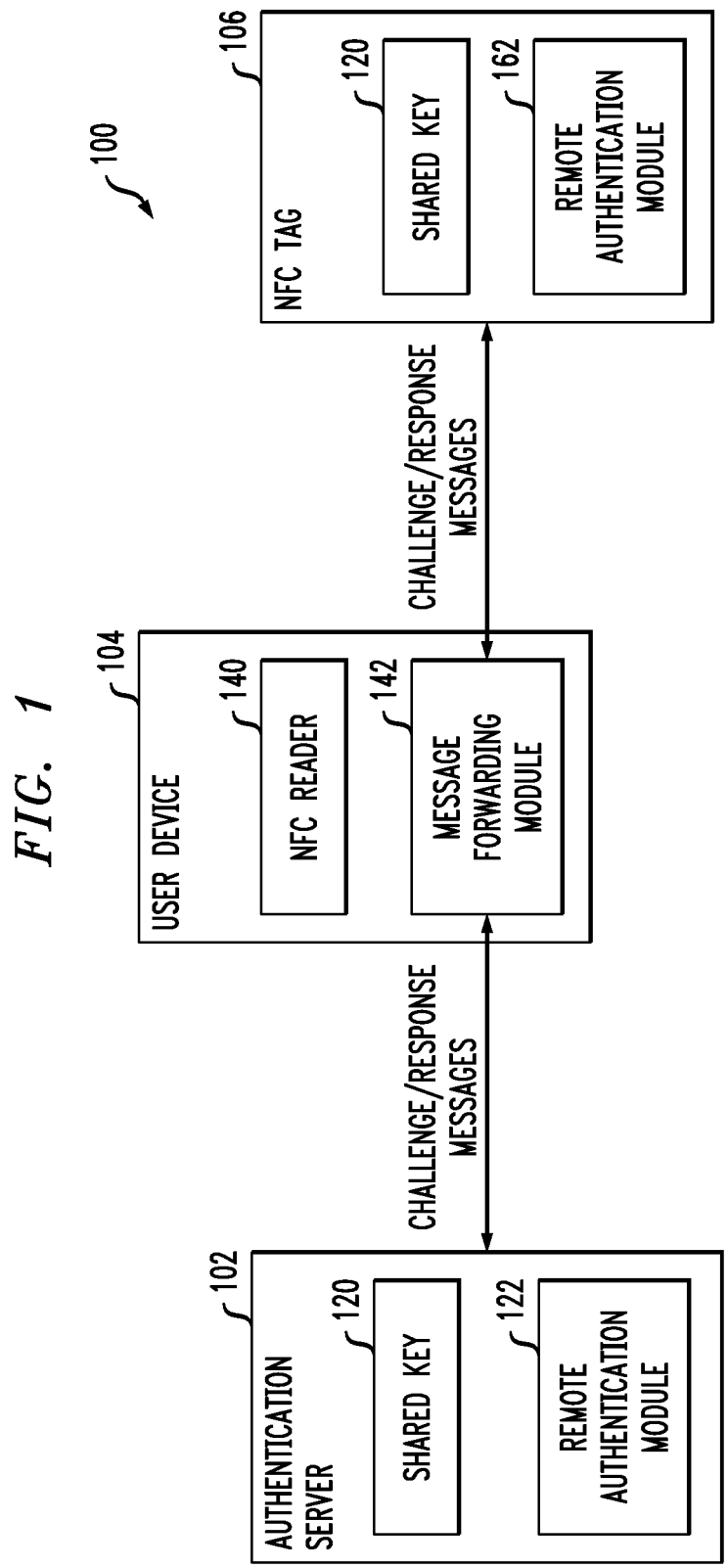
FIG. 1 is a block diagram of a communication system implementing authentication of a processing device in an illustrative embodiment of the invention.

FIG. 1 illustrates a communication system 100. The communication system 100 includes an authentication server 102, a user device 104 and an NFC tag 106. The NFC tag 106 and the authentication server 102 have a shared key 120 stored in respective memories therein. It is important to note that an NFC tag 106 may store a plurality of shared keys for use in authenticating to a plurality of authentication servers or respective keys for various applications which require access to protected resources. For example, the MIFARE DESFire™ EV1 token supports up to 28 applications, with each application having its own key. Thus, a single MIFARE DESFire™ EV1 token may support up to 28 independent authentication applications. It will be appreciated that various other NFC tags may have different numbers of shared keys stored therein, and may in some instances have more than one shared key which corresponds to a single authentication application.

The authentication server 102 comprises a remote authentication module 122. The NFC tag 106 comprises a remote authentication module 162. The remote authentication modules 122 and 162 may comprise respective hardware, software or combinations of hardware and software which may be utilized for carrying out a challenge/response authentication protocol between the authentication server 102 and the NFC tag 106. The user device 104 comprises a message forwarding module 142. The message forwarding module 142 may comprise hardware, software or combinations of hardware and software which may be utilized for forwarding messages and other communications in a challenge/response protocol carried out between authentication server 102 and NFC tag 106.

It is important to note that although FIG. 1 illustrates a communication system 100 with only single instances of the authentication server 102, user device 104 and NFC tag 106, embodiments are not limited solely to this arrangement. As described above, an NFC tag 106 may store a number of shared keys for use with different authentication applications. Thus, a user device 104 and NFC tag 106 may communicate with two or more authentication servers. In addition, a given authentication server 102 may communicate with a number of user devices and/or NFC tags.

In some embodiments, the NFC tag 106 may store a first set of shared keys for use with user device 104 and one or more additional sets of keys for other user devices. A user or owner of the NFC tag 106 may use the NFC tag 106 with a number of different processing devices interchangeably, such as the user's smartphone and the user's tablet. The NFC tag 106 may store shared keys which are associated with the user or owner only, with one or more particular processing devices, or with combinations of one or more particular users and processing devices. In other embodiments, shared keys stored in the NFC tag 106 may not be associated with any particular user or processing device.

Figure 2:
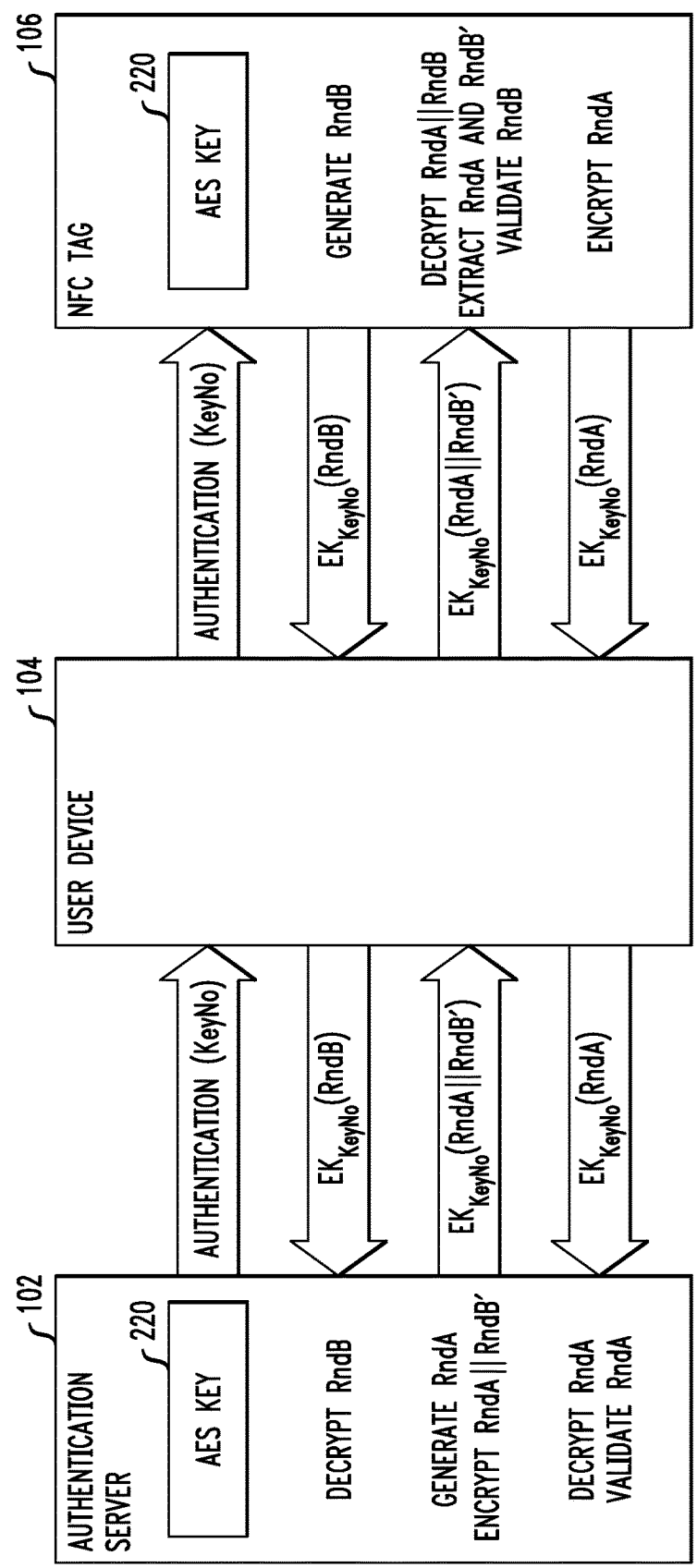
FIG. 2 shows an authentication process carried out in the communication system of FIG. 1 in an illustrative embodiment of the invention.

FIG. 2 illustrates a challenge/response authentication process which is carried out in the communication system 100 of FIG. 1. The challenge/response authentication process begins with the authentication server 102 sending a message to the user device 104 for forwarding to the NFC tag indicating the start of the authentication process and specifying a particular key number (KeyNo). The authentication server 102 and the NFC tag 106 may each store shared keys in the form of AES key 220. The AES key 220 may include one or more 128-bit AES keys. It is important to note, however, that various other types of keys may be utilized in embodiments of the invention.

The message Authenticate (KeyNo) specifies a given one of the AES keys stored on the NFC tag 106 and the authentication server 102 for use in encrypting subsequent communications for the authentication protocol. In some embodiments, the AES Key 220 may be pre-provisioned in the NFC tag 106 and periodically updated in a key update or key rotation process. The key update process may take place after a certain number of authentication protocols or at particular time intervals.

The user device 104 receives the message Authenticate (KeyNo) from the authentication server 102, and forwards this message to the NFC tag 106. The NFC tag 106 generates a random number RndB, and encrypts RndB with KeyNo resulting in $EK_{KeyNo}$(RndB). The NFC tag 106 sends $EK_{KeyNo}$ (RndB) to the user device 104 for forwarding to the authentication server 102. The user device 104 receives $EK_{KeyNo}$(RndB) from the NFC tag 106 and forwards $EK_{KeyNo}$(RndB) to the authentication server 102.

The authentication server 102 decrypts the message $EK_{KeyNo}$ (RndB) using KeyNo to obtain RndB. The authentication server 102 then generates a random number RndA, and encrypts a concatenation of RndA and a derivative of RndB denoted RndB' using KeyNo resulting in $EK_{KeyNo}$ (RndA∥RndB'). In some embodiments, one or more bytes in RndB may be shifted so as to obtain RndB'. Various other approaches, however, may be utilized to derive RndB' from RndB. In addition, in some embodiments the authentication server 102 does not encrypt a concatenation of RndA and RndB' and instead may encrypt a concatenation of RndA and RndB using KeyNo.

The authentication server 102 sends $EK_{KeyNo}$ (RndA∥RndB') to user device 104 for forwarding to the NFC tag 106. The user device 104 receives $EK_{KeyNo}$(RndA∥RndB') and forwards $EK_{KeyNo}$(RndA∥RndB') to the NFC tag 106.

The NFC tag 106 decrypts $EK_{KeyNo}$(RndA∥RndB') using KeyNo to obtain RndA∥RndB'. The NFC tag 106 extracts RndA and RndB' from RndA∥RndB'. The NFC tag 106 obtains RndB from RndB' and compares the obtained RndB with the generated RndB to validate the obtained RndB. If the obtained RndB is validated, the authentication server 102 is authenticated to the NFC tag 106. The fact that the authentication server 102 was able to decrypt $EK_{KeyNo}$ (RndB) authenticates the authentication server 102 to the NFC tag 106. If RndB is validated, the NFC tag 106 encrypts the extracted RndA using KeyNo resulting in $EK_{KeyNo}$ (RndA). The NFC tag 106 sends $EK_{KeyNo}$(RndA) to the user device 104 for forwarding to the authentication server 102.

The user device 104 receives $EK_{KeyNo}$(RndA) and forwards $EK_{KeyNo}$ (RndA) to the authentication server. The authentication server 102 decrypts $EK_{KeyNo}$(RndA) to obtain RndA. The obtained RndA is compared with the generated RndA to validate the obtained RndA. If the obtained RndA matches the generated RndA, the authentication server 102 authenticates the NFC tag 106. The fact that the NFC tag 106 was able to decrypt $EK_{KeyNo}$(RndA∥RndB') authenticates the NFC tag 106 to the authentication server 102.

In embodiments of the invention, after a successful authentication protocol between the authentication server 102 and the NFC tag 106, the user device 104 is authenticated to the authentication server 102. A session key may be established for future secure communications between the authentication server 102 and the NFC tag 106 and/or the user device 104. The session key may be based at least in part on RndA and RndB. The session key may be utilized in a subsequent key update or key rotation process to update one or more keys stored on the NFC tag 106.

Figure 3:
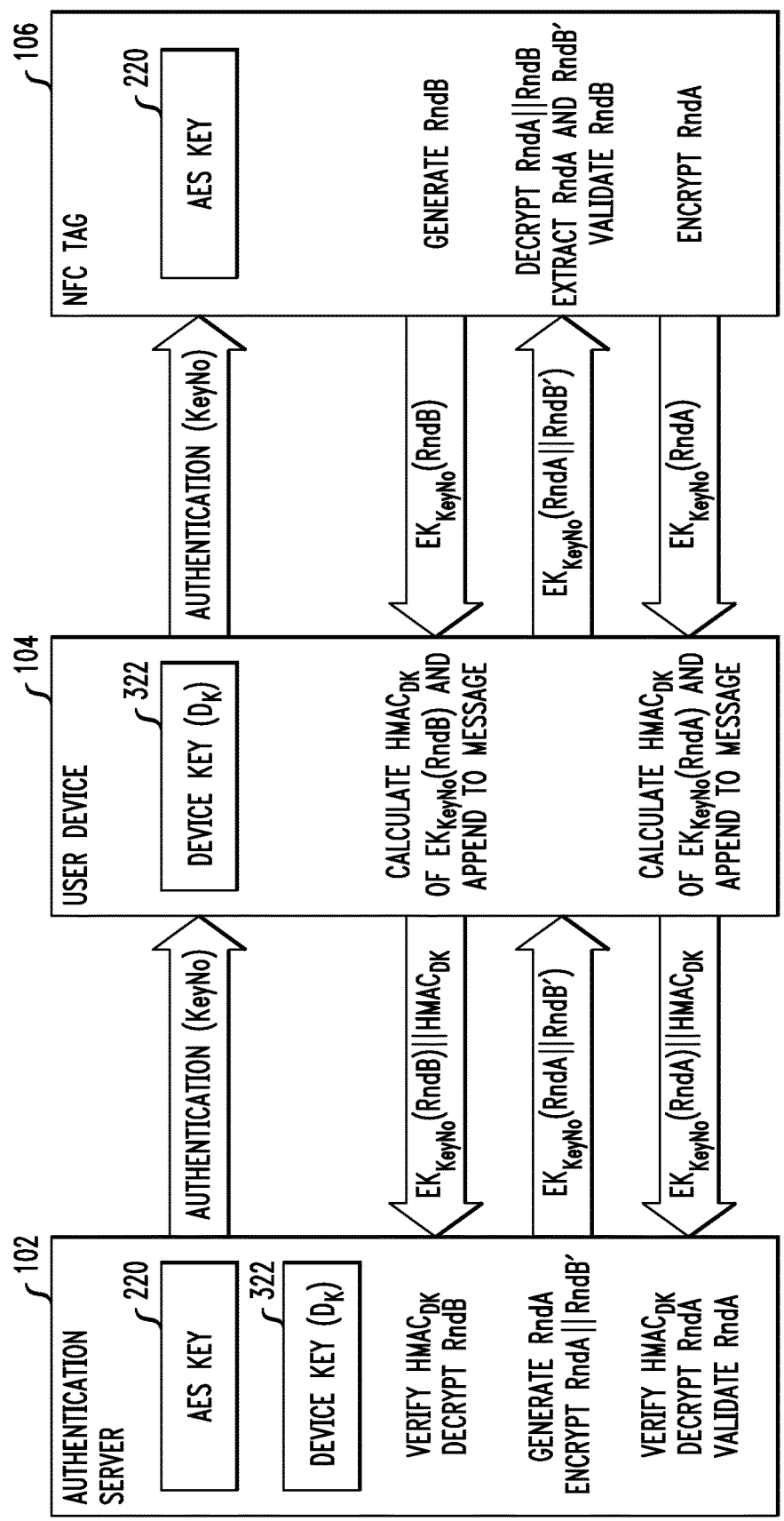
FIG. 3 shows another authentication process carried out in the communication system of FIG. 1 in an illustrative embodiment of the invention.

FIG. 3 illustrates another challenge/response authentication process which is carried out in the communication system 100 of FIG. 1. The challenge/response authentication process of FIG. 3 is similar to that of FIG. 2 and provides device binding.

The challenge/response authentication process of FIG. 3 begins with the authentication server 102 sending a message to the user device 104 for forwarding to the NFC tag indicating the start of the authentication process and specifying a particular key number (KeyNo).

The user device 104 receives the message Authenticate (KeyNo) from the authentication server 102, and forwards this message to the NFC tag 106. The NFC tag 106 generates a random number RndB, and encrypts RndB with KeyNo resulting in $EK_{KeyNo}$(RndB). The NFC tag 106 sends $EK_{KeyNo}$(RndB) to the user device 104 for forwarding to the authentication server 102.

The user device 104 and the authentication server 102 each have stored therein a device key $D_K$ 322. The device key $D_K$ 322 can be used for binding the identity of the user device 104 to messages which are forwarded from the NFC tag 106 to the authentication server 102. The authentication server 102 can verify that the user device 104 forwarded the messages by determining whether the user device has knowledge of the device key $D_K$ 322. In the authentication process of FIG. 3, the user device 104 calculates a keyed hash of the message, $HMAC_{DK}$, using the device key $D_K$ 322. The keyed hash $HMAC_{DK}$ is appended to the original message $EK_{KeyNo}$(RndB) received from the NFC tag 106. The user device 104 then forwards $EK_{KeyNo}$(RndB)||$HMAC_{DK}$ to the authentication server 102.

The authentication server 102 receives $EK_{KeyNo}$(RndB)||$HMAC_{DK}$ from the user device 104. The authentication server 102 verifies the keyed hash $HMAC_{DK}$ to ensure that the message was received from a trusted user device 104 (i.e., a user device with knowledge of the device key $D_K$ 322). After verifying the keyed hash $HMAC_{DK}$, the authentication server 102 decrypts the message $EK_{KeyNo}$(RndB) using KeyNo to obtain RndB. Next, the authentication server 102 generates a random number RndA, and encrypts a concatenation of RndA and a derivative of RndB denoted RndB' using KeyNo resulting in $EK_{KeyNo}$(RndA||RndB'). The authentication server 102 sends $EK_{KeyNo}$(RndA||RndB') to user device 104 for forwarding to the NFC tag 106. The user device 104 receives $EK_{KeyNo}$(RndA||RndB') and forwards $EK_{KeyNo}$(RndA||RndB') to the NFC tag 106.

The NFC tag 106 decrypts $EK_{KeyNo}$(RndA||RndB') using KeyNo to obtain RndA||RndB'. The NFC tag 106 extracts RndA and RndB' from RndA||RndB'. The NFC tag 106 obtains RndB from RndB' and compares the obtained RndB with the generated RndB to validate the obtained RndB. If the obtained RndB is validated, the NFC tag 106 encrypts the extracted RndA using KeyNo resulting in $EK_{KeyNo}$(RndA). The NFC tag 106 sends $EK_{KeyNo}$(RndA) to the user device 104 for forwarding to the authentication server 102. The fact that the authentication server 102 was able to decrypt $EK_{KeyNo}$(RndB) authenticates the authentication server 102 to the NFC tag 106.

The user device 104 receives $EK_{KeyNo}$(RndA) and calculates a keyed hash $HMAC_{DK}$ of $EK_{KeyNo}$(RndA) using the device key DK 322. The keyed hash $HMAC_{DK}$ is appended to $EK_{KeyNo}$(RndA). The user device 104 then forwards $EK_{KeyNo}$(RndA)||$HMAC_{DK}$ to the authentication server 102.

The authentication server 102 receives $EK_{KeyNo}$(RndA)||$HMAC_{DK}$ from the user device 104. The authentication server 102 verifies the keyed hash $HMAC_{DK}$ to ensure that the message was received from a trusted user device 104 with knowledge of the device key $D_K$ 322. After verifying the keyed hash $HMAC_{DK}$, the authentication server 102 decrypts the message $EK_{KeyNo}$(RndA) using KeyNo to obtain RndA. The obtained RndA is compared with the generated RndA to validate the obtained RndA. If the obtained RndA matches the generated RndA, the authentication server 102 authenticates the user device 104 and the NFC tag 106. The fact that the NFC tag 106 was able to decrypt $EK_{KeyNo}$(RndA||RndB') authenticates the NFC tag 106 to the authentication server 102.

The user device 104 is authenticated to the authentication server 102 by virtue of the successful completion of the challenge/response protocol between the authentication server 102 and the NFC tag 106. With device binding using the device key $D_K$ 322, the authentication server 102 can ensure that the user device 104 which forwards messages from the NFC tag 106 is a trusted user device. A session key may be established for future secure communications between the authentication server 102 and the NFC tag 106 and/or the user device 104. The session key may be based at least in part on RndA and RndB. The session key may be utilized in a subsequent key update process to update one or more keys stored on the NFC tag 106.

Figure 4:
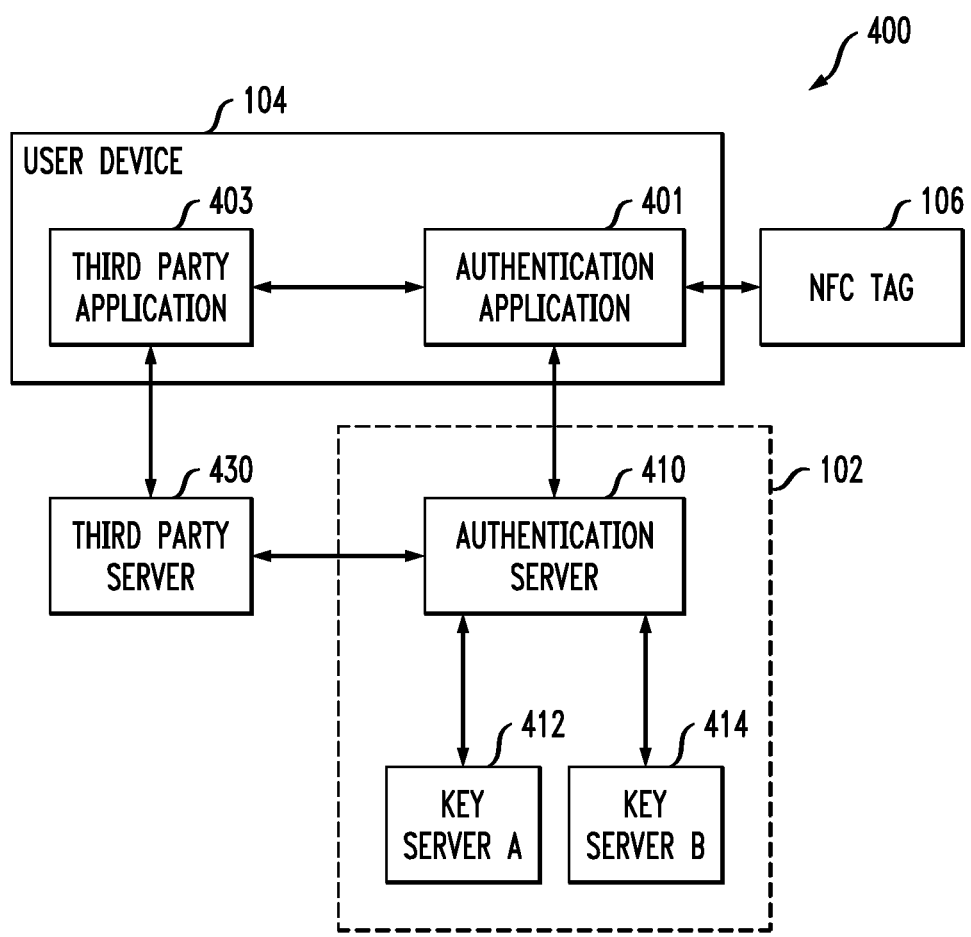
FIG. 4 shows one possible implementation of the FIG. 1 system including a third party application and third party server in an illustrative embodiment of the invention.

FIG. 4 shows a possible implementation of the communication system 100 of FIG. 1. FIG. 4 shows communication system 400, including user device 104, NFC tag 106, authentication server 102 and third party server 430. The authentication server 102 comprises an outfacing authentication server 410, key server A 412 and key server B 414. The user device 104 comprises an authentication application 401 and a third party application 403.

The third party application 403 is an application which requires a protected resource from the third party server 430. To access the protected resource, the user device 104 must authenticate to the third party server 430. The third party application 403 may be a software application which is installed on the user device 104. The third party application 403 may alternatively by a web application running in a browser on the user device 104, a native application, a virtual private network (VPN) application, or a mobile device management (MDM) application. It is to be appreciated that various other application types may be utilized, including combinations of application types. In addition, while FIG. 4 shows only a single third party application 403 on the user device 104, a user device 104 may run two or more independent third party applications at a given time.

As described above, the third party server 430 hosts a protected resource. The third party server 430 may be a web server, a VPN server, etc. The user device 104 may authenticate to the third party server 430 as part of a single sign-on scheme. Protocols such as OAuth may be used for such authentication.

The authentication application 401 is configured to authenticate a user on behalf of the third party application 403. The authentication application 401 acts as an interface or middle man between the NFC tag 106 and the authentication server 102.

Authentication server 102 performs the challenge/response protocol with the NFC tag 106. The authentication server 102 includes an outfacing authentication server 410, and key server A 412 and key server B 414 coupled to the outfacing authentication server 410. The outfacing authentication server 410 manages communications with authentication server 102, and provides interfaces for authentication and key provisioning procedures as well as an interface for the third party server 430. The third party server 430 can query the authentication server 102 to determine if a particular third party application 403 or user device 104 is authenticated.

Key server A 412 and key server B 414 store key information for challenge/response authentications to be performed with the NFC tag 106. Storing the key information separate from the outfacing authentication server 410 can help prevent attacks on the outfacing authentication server 410. The key servers 412 and 414 are independent of one another. In some embodiments, a successful completion of the challenge/response authentication protocol with the NFC tag 106 requires both key server A 412 and key server B 414 to authenticate the NFC tag 106 and user device 104 using independent keys. In these embodiments, breaking into or otherwise comprising a single one of key server A 412 and key server B 414 will not compromise the system. In other embodiments, one of the key servers may be selected randomly to authenticate the NFC tag 106 or may serve as a backup key server to the other. Key server A 412 and/or key server B 414 perform cryptographic operations for the challenge/response authentication protocol with the NFC tag 106. The results of the cryptographic operations are forwarded to the outfacing authentication server 410.

The NFC tag 106 stores a set of keys in a memory therein. The set of keys may include independent keys for each of key server A 412 and key server B 414. Each of the independent keys may further comprise a number of application-specific keys for each of key server A 412 and key server B 414. For example, the user device 104 may run two or more independent third party applications which interface with two or more independent third party servers. Different keys may be utilized for authenticating the two or more independent third party applications. In other embodiments, a single sign-on scheme may be utilized. In these embodiments, the NFC tag 106 does not require separate keys for each third party application.

An authentication flow which may be utilized in the communication system 400 will now be described. When the third party application 403 seeks to access a protected resource on the third party server 430 which requires authentication, the third party application 403 can launch the authentication application 401 on the user device 104 with a callback uniform resource locator (URL). The callback URL can be registered on the authentication server 102 and trusted. The authentication application 401 launches and prompts a user of the user device 104 to tap or otherwise activate the NFC tag 106 to initiate the challenge/response authentication. The NFC tag 106 may carry out a challenge/response authentication protocol with the authentication server 102 in a manner similar to that described above with respect to FIG. 2 or FIG. 3. As described above, in some embodiments a challenge/response authentication protocol may comprise a first challenge/response authentication performed with a key stored on key server A 412 and a second challenge/response authentication performed with a different key stored on key server B 414.

After a successful completion of the challenge/response authentication protocol between the NFC tag 106 and the authentication server 102, the authentication application 401 re-launches the third party application 403 using the callback URL. When the third party application 403 attempts to access the protected resource, the third party server 430 queries the authentication server 102. The outfacing authentication server 410 provides the authentication result to the third party server 430. The third party server 430, on confirming that the user device 104 and/or third party application 403 is authenticated, permits the third party application 403 to access one or more protected resources.

As discussed above, embodiments may provide for key rotation. Key rotation allows for the updating or replacement of existing keys and/or provisioning new keys to the NFC tag 106. After a successful challenge/response authentication protocol, the authentication server 102 may send one or more new keys to the NFC tag 106. The new keys may replace old or existing keys stored in a memory of the NFC tag 106. Keys stored on the NFC tag 106 may be rotated periodically to protect against attack. In some embodiments, keys on the NFC tag 106 may be replaced after each or after a certain number of authentications are performed. In other embodiments, keys stored on the NFC tag may be updated after a certain elapsed time regardless of the number of authentications performed with one or more old keys. The authentication server 102 will typically initiate the key rotation procedure although in some instances another device such as NFC tag 106 may initiate the key rotation procedure. In embodiments with multiple key servers, the key rotation intervals may be different for each key server.

In some embodiments, secret rotation may be utilized. NFC tags may have protected storage. For example, the MIFARE DESFire™ EV1 token provides for protected storage therein. Read and write commands on a given NFC tag such as NFC tag 106 may be protected and require a special key or other authorization. As, discussed above, a session key may be established after a successful completion of a challenge/response protocol. By way of example, in the authentication processes of FIGS. 2 and 3, RndA and RndB may be utilized to derive a session key used for future read/write operations to protected storage on NFC tag 106.

In some embodiments, a successful completion of a challenge/response authentication protocol depends on the establishment of a shared secret. For example, in the authentication processes of FIGS. 2 and 3, the NFC tag 106 and authentication server 102 may establish a shared secret after authenticating one another. The NFC tag 106 can store the shared secret in a protected storage, while the authentication server 102 can store a hash of the shared secret in a memory of the authentication server 102. To authenticate the user device 104, the NFC tag 106 can send a message to the user device 104 for forwarding to the authentication server 102 which comprises the shared secret encrypted with a session key. As discussed above, a session key may be derived from RndA and RndB. The authentication server 102, on receiving the message from the user device 104, can decrypt the message to obtain the shared secret. If a hash of the obtained shared secret matches the hash of the shared secret stored in a memory of the authentication device 102, the user device 104 is authenticated.

In embodiments where multiple key servers are used, each key server may compare a calculated hash of a received shared secret with the hash of the shared secret stored in a memory of the authentication server to authenticate a user device. For example, key server A 412 may receive a first value which is encrypted using the session key and calculate a hash of the first value. If the calculated hash of the first value matches the hash of the shared secret stored in the memory of the authentication server 102, the key server A 412 authenticates the user device 104. The key server B 414 may receive a second value which is encrypted using the session key and calculate a hash of the second value. If the calculated hash of the second value matches the hash of the shared secret stored in the memory of the authentication server 102, the key server B 414 authenticates the user device 104. By storing a hash of the shared secret in a memory of the authentication server 102 rather than the shared secret itself, the authentication server 102 is protected from attacks. The shared secret stored in a protected storage of the NFC tag 106 and the hash of the shared secret stored in a memory of the authentication server 102 may be rotated or updated periodically in a manner similar to the described above with respect to the key rotation process.

Figure 5:
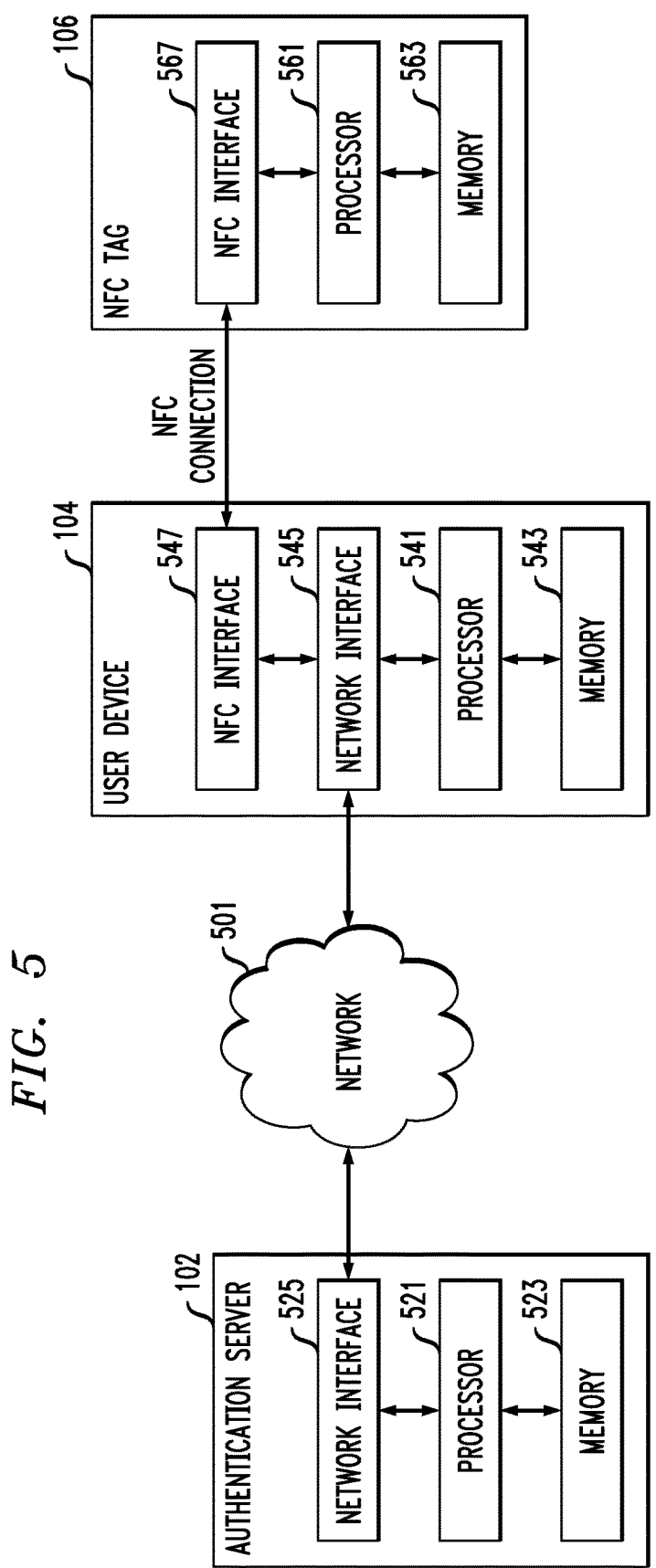
FIG. 5 shows another possible implementation of the FIG. 1 system in an illustrative embodiment of the invention.

FIG. 5 shows one possible implementation of the communication system 100 of FIG. 1. FIG. 5 shows the authentication server 102 and user device 104 connected over a network 501. The user device 104 is also connected to NFC tag 106 using an NFC connection. The user device 104 is an example of a processing or computing device. A processing device may comprise, for example, a computer, a smartphone or other mobile telephone, a tablet, or other type of communication device.

Authentication server 102 comprises a processor 521 coupled to a memory 523 and a network interface 525. The processor 521 may comprise a microprocessor, a microcontroller, an application-specific integrated circuit (ASIC), a field-programmable gate array (FPGA) or other type of processing circuitry, as well as portions or combinations of such circuitry elements. The memory 523 may comprise random access memory (RAM), read-only memory (ROM) or other types of memory, in any combination.

The memory 523 and other memories disclosed herein may be viewed as examples of what are more generally referred to as "computer program products" storing executable computer program code.

Also included in the authentication server 102 is network interface 525. The network interface 525 allows the authentication server 102 to communicate over the network 501 with the user device 104, and may comprise one or more conventional transceivers.

The user device 104 comprises processor 541 coupled to memory 543. The processor 541 may comprise a microprocessor, a microcontroller, an ASIC, an FPGA or other type of processing circuitry, as well as portions or combinations of such circuitry elements, and the memory 543 may comprise RAM, ROM or other types of memory, in any combination.

Also included in the user device 104 is network interface 545. The network interface circuitry 545 permits the user devices 104 to communicate over the network 501 with the authentication server 102 and other user devices, servers, etc. not shown in FIG. 5. The network interface circuitry 545 may comprise one or more conventional transceivers.

The user device 104 further comprises NFC interface 547. The NFC tag 106 similarly comprises an NFC interface 567, permitting the user device 104 and the NFC tag 106 to establish an NFC connection.

The NFC tag 106 further comprises a processor 561 coupled to a memory 563. The processor 561 may comprise a microprocessor, a microcontroller, an ASIC, an FPGA or other type of processing circuitry, as well as portions or combinations of such circuitry elements, and the memory 563 may comprise RAM, ROM or other types of memory, in any combination. The NFC tag 106 may be implemented as a lightweight processing device with limited processing power. The NFC tag 106 may be configured to draw its power from the NFC field established in the NFC connection with the user device 104.

The network 501 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The NFC tag 106, as described above, may take on a number of form factors. In addition, the NFC tag 106 may be embedded within another device such as user device 104. The NFC tag 106 may be associated with a particular user device such as user device 104. The NFC tag 106 may alternatively be used with a number of distinct user devices. In some embodiments, the NFC tag 106 may be located within a physical casing of the user device 104, though the NFC tag 106 may be removable.

The NFC tag 106 may comprise an authentication token such as the RSA SecurID® user authentication token, commercially available from RSA, The Security Division of EMC Corporation, of Bedford, Mass., U.S.A., suitably modified to function as described herein. Authentication tokens may be time-synchronous tokens, event synchronous tokens, hybrid time-synchronous and event synchronous tokens, or various other token types. An authentication token may be a hardware authentication token or a software authentication token.

It is to be appreciated that the particular set of elements shown in FIG. 5 is presented by way of example, and in other embodiments additional or alternative elements may be used. Thus, another embodiment may include additional networks and additional sets of user devices, servers and NFC tags.

As mentioned previously, various elements of the communication system 100 such as user devices, authentication servers, NFC tags or their associated functional modules may be implemented at least in part in the form of software. Such software is stored and executed utilizing respective memory and processor elements of at least one processing device. The system may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

The particular processing operations and other system functionality described in conjunction with FIGS. 1-4 are presented by way of illustrative example only, and should not be construed as limiting the scope of the invention in any way. Alternative embodiments can use other types of processing operations for authentication. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different authentication techniques.

It is to be appreciated that the authentication and other processing functionality such as that described in conjunction with FIGS. 1-4 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

Also, the particular configuration, elements and operating parameters of the embodiments described above are not requirements of the invention, and should not be construed as limiting the scope of the invention in any way. For example, while FIGS. 2 and 3 show particular examples of a challenge/response authentication protocol without and with device binding, respectively, numerous variations of challenge/response authentications and device or other identity binding techniques may be utilized. In addition, other authentication protocols may be used in addition to or in place of the specific challenge/response authentication protocols described herein. Examples of conventional authentication protocols are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As another example, in the authentication processes described above, various devices may initiate the challenge/response authentication protocol. In addition, the respective devices which act as an NFC initiator and an NFC target may vary. In some embodiments, the user device 104 may act as the NFC initiator in establishing an NFC connection with the NFC tag 106. In other embodiments, the NFC tag 106 may act as the NFC initiator.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a processing device comprising:
near field communication (NFC) interface circuitry;
network interface circuitry;
a memory; and
a processor coupled to the memory;
the processing device being configured to:
establish an NFC connection with an NFC tag using the NFC interface circuitry;
establish a network connection with an authentication server using the network interface circuitry;
forward one or more messages between the NFC tag and the authentication server, the one or more messages comprising messages of a challenge/response authentication protocol performed between the NFC tag and the authentication server;
wherein responsive to a successful completion of the challenge/response authentication protocol between the NFC tag and the authentication server, the processing device is authenticated to the authentication server;
wherein the processing device is configured to bind a given one of the one or more messages, received from the NFC tag for forwarding to the authentication server, to an identity of the processing device utilizing a device key known to the processing device and the authentication server by:
calculating a keyed hash of the given message utilizing the device key;
combining the keyed hash with the given message to generate a bound message; and
forwarding the bound message to the authentication server.

2. An apparatus comprising:
a processing device comprising:
near field communication (NFC) interface circuitry;
network interface circuitry;
a memory; and
a processor coupled to the memory;
the processing device being configured to:
establish an NFC connection with an NFC tag using the NFC interface circuitry;
establish a network connection with an authentication server using the network interface circuitry;
forward one or more messages between the NFC tag and the authentication server, the one or more messages comprising messages of a challenge/response authentication protocol performed between the NFC tag and the authentication server;
wherein responsive to a successful completion of the challenge/response authentication protocol between the NFC tag and the authentication server, the processing device is authenticated to the authentication server; and
wherein the one or more messages comprise:
a first message received from the authentication server for forwarding to the NFC tag indicating a given shared key known to the authentication server and the NFC tag;
a second message received from the NFC tag for forwarding to the authentication server comprising a first random number, the second message being encrypted using the given shared key;
a third message received from the authentication server for forwarding to the NFC tag comprising a derivative of the first random number appended to a second random number, the third message being encrypted using the given shared key; and
a fourth message received from the NFC tag for forwarding to the authentication server comprising the second random number, the fourth message being encrypted using the given shared key.

3. The apparatus of claim 2, wherein the processing device does not have knowledge of the given shared key.

4. The apparatus of claim 2, wherein the processing device is configured to:
calculate a first keyed hash of the second message received from the NFC tag using a device key known to the authentication server;
forward the second message with the first keyed hash appended thereto to the authentication server;
calculate a second keyed hash of the fourth message received from the NFC tag using the device key; and
forward the fourth message with the second keyed hash appended thereto to the authentication server.

5. The apparatus of claim 1, wherein the processing device is configured to establish the NFC connection with the NFC tag and establish the network connection with the authentication server responsive to a request from a third party application running on the processing device, the third party being associated with a first entity different than a second entity associated with the authentication server.

6. The apparatus of claim 5, wherein:
the request from the third party application comprises a callback uniform resource locator (URL); and
the processing device is configured to re-launch the third party application using the callback URL responsive to the successful completion of the challenge/response authentication protocol between the NFC tag and the authentication server.

7. The apparatus of claim 5, wherein the third party application running on the processing device is configured to access a protected resource of a third party server based at least in part on authentication information provided by the authentication server.

8. A method comprising:
establishing, by a processing device, an NFC connection with an NFC tag;
establishing, by the processing device, a network connection with an authentication server; and
forwarding, by the processing device, one or more messages between the NFC tag and the authentication server, the one or more messages comprising messages of a challenge/response authentication protocol performed between the NFC tag and the authentication server;
wherein responsive to a successful completion of the challenge/response authentication protocol between the NFC tag and the authentication server, the processing device is authenticated to the authentication server;
wherein the processing device binds a given one of the one or more messages, received from the NFC tag for forwarding to the authentication server, to an identity of the processing device utilizing a device key known to the processing device and the authentication server by:
calculating a keyed hash of the given message utilizing the device key;
combining the keyed hash with the given message to generate a bound message; and
forwarding the bound message to the authentication server.

9. A non-transitory processor-readable storage medium having instruction code embodied therein which when executed by a processor implements the steps of the method of claim 8.

10. An apparatus comprising:
an authentication server comprising:
network interface circuitry;
a memory; and
a processor coupled to a memory;
the authentication server being configured to:
establish a network connection with a processing device using the network interface circuitry;
perform a challenge/response authentication protocol with an NFC tag connected to the processing device by sending to and receiving from the processing device over the network connection one or more messages for the challenge/response authentication protocol; and
authenticate the processing device responsive to a successful completion of the challenge/response authentication protocol with the NFC tag;
wherein a given one of the one or more messages comprises a bound message forwarded from the NFC tag to the authentication server by the processing device;
wherein the bound message is bound to an identity of the processing device utilizing a device key known to the processing device and the authentication server, the bound message comprising a combination of the given message and a first keyed hash; and
wherein the authentication server is configured to verify the bound message by:
calculating a second keyed hash of the given message utilizing the device key; and
verifying that the second keyed hash matches the first keyed hash in the bound message.

11. The apparatus of claim 10, wherein each of the one or more messages received from the processing device is bound to the identity of the processing device.

12. An apparatus comprising:
an authentication server comprising:
network interface circuitry;
a memory; and
a processor coupled to a memory;
the authentication server being configured to:
establish a network connection with a processing device using the network interface circuitry;
perform a challenge/response authentication protocol with an NFC tag connected to the processing device by sending to and receiving from the processing device over the network connection one or more messages for the challenge/response authentication protocol; and
authenticate the processing device responsive to a successful completion of the challenge/response authentication protocol with the NFC tag;
wherein at least one of the one or more messages is bound to an identity of the processing device utilizing a device key known to the processing device and the authentication server; and
wherein the authentication server is configured to perform the challenge/response authentication protocol with the NFC tag by:
sending a first message to the processing device for forwarding to the NFC tag, the first message indicating a given shared key known to the authentication server and the NFC tag;
receiving a second message from the processing device, wherein the second message originates from the NFC tag and is encrypted using the given shared key;
decrypting the second message using the given shared key to obtain a first random number;
generating a second random number;
sending a third message to the processing device for forwarding to the NFC tag, the third message being encrypted using the given shared key and comprising a derivative of the first random number appended to the second random number;
receiving a fourth message from the processing device, wherein the fourth message originates from the NFC tag and is encrypted using the given shared key; and
decrypting the fourth message using the given shared key to obtain the second random number.

13. The apparatus of claim 12, wherein the authentication server sends a fifth message to the processing device for forwarding to the NFC tag responsive to the successful completion of the challenge/response authentication protocol, the fifth message comprising one or more new shared keys for storage on the NFC tag.

14. The apparatus of claim 12, wherein:
the second message further comprises a first keyed hash of the second message appended thereto, the first keyed hash being calculated using the device key;
the fourth message further comprises a second keyed hash of the fourth message appended thereto, the second keyed hash being calculated using the device key; and
the authentication server is configured to verify the identity of the processing device by decrypting the first keyed hash and the second keyed hash using the device key.

15. The apparatus of claim 10, wherein:

the authentication server further comprises a first key server and a second key server, the first key server being independent of the second key server; and the challenge/response authentication protocol with NFC tag comprises a first challenge/response authentication performed with the first key server and a second challenge/response authentication performed with the second key server;

wherein the first key server and the second key server store respective first and second sets of shared keys known to the NFC tag, the first and second sets of shared keys being independent of one another and being utilized in the first and second challenge/response authentications, respectively.

16. The apparatus of claim 15, wherein:

the authentication server and the NFC tag establish a shared secret during the challenge/response authentication protocol, the NFC tag storing the shared secret in a protected storage and the authentication server storing a hash of the shared secret in the memory;

the first key server receives a first value from the NFC tag through the processing device during the first challenge/response authentication, the first key server authenticating the processing device by comparing a hash of the first value with the hash of the shared secret stored in the memory of the authentication server; and the second key server receives a second value from the NFC tag through the processing device during the second challenge/response authentication, the second key server authenticating the processing device by comparing a hash of the second value with the hash of the shared secret stored in the memory of the authentication server.

17. The apparatus of claim 10, wherein:

the challenge/response authentication protocol is initiated by a third party application running on the processing device;

the authentication server receives a query from a third party server regarding an authentication of the processing device;

the authentication server sends a message comprising authentication information if the challenge/response authentication protocol was successfully completed; and the third party is associated with a first entity different than a second entity associated with the authentication server.

18. A method comprising:

establishing, by an authentication server, a network connection with a processing device;

performing, by the authentication server, a challenge/response authentication protocol with an NFC tag connected to the processing device by sending to and receiving from the processing device over the network connection one or more messages for the challenge/response authentication protocol; and authenticating, by the authentication server, the processing device responsive to a successful completion of the challenge/response authentication protocol with the NFC tag;

wherein a given one of the one or more messages comprises a bound message forwarded from the NFC tag to the authentication server by the processing device;

wherein the bound message is bound to an identity of the processing device utilizing a device key known to the processing device and the authentication server, the bound message comprising a combination of the given message and a first keyed hash; and wherein the authentication server is configured to verify the bound message by:

calculating a second keyed hash of the given message utilizing the device key; and verifying that the second keyed hash matches the first keyed hash in the bound message.

19. A non-transitory processor-readable storage medium having instruction code embodied therein which when executed by a processor implements the steps of the method of claim 18.

20. The apparatus of claim 1, wherein:

the one or more messages of the challenge/response authentication protocol performed between the NFC tag and the authentication server comprise a first message specifying a given one of a plurality of shared keys to be used in encrypting subsequent messages of the challenge/response authentication protocol; and the given shared key is known to the authentication server and the NFC tag but not the processing device.

* * * * *